(12) United States Patent
Freedman et al.

(10) Patent No.: US 9,904,597 B2
(45) Date of Patent: *Feb. 27, 2018

(54) METHODS AND APPARATUS FOR MULTI-PHASE RESTORE

(71) Applicant: Apple Inc., Cupertino, CA (US)

(72) Inventors: Gordon J. Freedman, San Jose, CA (US); Kenneth B. McNeil, San Jose, CA (US); Edward T. Schmidt, San Francisco, CA (US); Thomas Alsina, Mountain View, CA (US); James H. Callender, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/065,802

(22) Filed: Mar. 9, 2016

(65) Prior Publication Data

US 2016/0188420 A1    Jun. 30, 2016

Related U.S. Application Data

(63) Continuation of application No. 14/645,088, filed on Mar. 11, 2015, now Pat. No. 9,317,369, which is a
(Continued)

(51) Int. Cl.
*G06F 17/30* (2006.01)
*G06F 11/14* (2006.01)

(52) U.S. Cl.
CPC ...... *G06F 11/1402* (2013.01); *G06F 11/1461* (2013.01); *G06F 11/1469* (2013.01);
(Continued)

(58) Field of Classification Search
USPC .................................................. 707/609, 679
See application file for complete search history.

(56) References Cited

U.S. PATENT DOCUMENTS

| 5,241,668 A | 8/1993 | Eastridge et al. |
| 5,737,557 A | 4/1998 | Sullivan et al. |

(Continued)

FOREIGN PATENT DOCUMENTS

| CN | 1262480 A | 8/2000 |
| CN | 1658195 A | 8/2005 |

(Continued)

OTHER PUBLICATIONS

International Search Report and Written Opinion from PCT Application No. PCT/US2012/039007 dated Oct. 24, 2012, pp. 1-16.
(Continued)

*Primary Examiner* — Kim Nguyen
(74) *Attorney, Agent, or Firm* — Downey Brand LLP

(57) ABSTRACT

Methods and apparatus to identify at least a first portion and a second portion of resources to restore to a device are described. The first portion of the resources may be restored atomically to the device before the second portion of the resources. The device may not respond to at least one user input during the restoration of the first portion of the resources. If the restoring of the first portion is successful, the second portion of the resources may be restored. The device may respond to the user input during the restoring of the second portion of the resources.

20 Claims, 10 Drawing Sheets

Related U.S. Application Data continuation of application No. 13/227,344, filed on Sep. 7, 2011, now abandoned.

(60) Provisional application No. 61/493,360, filed on Jun. 3, 2011.

(52) U.S. Cl.
CPC .... *G06F 17/30864* (2013.01); *G06F 11/1451* (2013.01); *G06F 11/1464* (2013.01); *G06F 2201/80* (2013.01); *G06F 2201/84* (2013.01)

(56) References Cited

U.S. PATENT DOCUMENTS

| | | | |
|---|---|---|---|
| 6,061,409 A | 5/2000 | Moriya et al. | |
| 6,141,771 A | 10/2000 | O'Brien et al. | |
| 6,247,126 B1 | 6/2001 | Beelitz et al. | |
| 6,301,675 B1 | 10/2001 | Andrews | |
| 6,611,850 B1 | 8/2003 | Shen | |
| 6,851,073 B1 | 2/2005 | Cabrera et al. | |
| 7,062,543 B2* | 6/2006 | Kishimoto | G06F 8/60 709/219 |
| 7,085,825 B1* | 8/2006 | Pishevar | H04L 67/1095 709/204 |
| 7,124,323 B2 | 10/2006 | Sanchez et al. | |
| 7,237,075 B2 | 6/2007 | Welsh et al. | |
| 7,330,997 B1 | 2/2008 | Odom | |
| 7,437,388 B1 | 10/2008 | DeVos | |
| 7,509,524 B2 | 3/2009 | Patel et al. | |
| 7,584,226 B2 | 9/2009 | Fatula, Jr. et al. | |
| 7,590,668 B2 | 9/2009 | Kathuria et al. | |
| 7,720,818 B1* | 5/2010 | Laura | G06Q 40/02 707/609 |
| 7,721,138 B1* | 5/2010 | Lyadvinsky | G06F 11/1417 714/10 |
| 7,725,704 B1 | 5/2010 | Beaverson et al. | |
| 7,734,578 B2* | 6/2010 | Prahlad | G06F 3/0607 707/609 |
| 7,747,577 B2* | 6/2010 | Cannon | G06F 11/1451 707/609 |
| 7,870,093 B2* | 1/2011 | Eguchi | G06F 11/1471 707/609 |
| 7,925,622 B2* | 4/2011 | Chapman | G06F 11/1451 707/609 |
| 8,042,172 B1 | 10/2011 | Heithcock et al. | |
| 8,103,632 B2* | 1/2012 | Schmidt | G06F 11/1451 707/646 |
| 8,180,735 B2* | 5/2012 | Ansari | G06Q 30/04 380/255 |
| 8,224,857 B2* | 7/2012 | Doganata | G06F 17/30867 707/791 |
| 8,255,731 B1 | 8/2012 | Alsina et al. | |
| 8,339,105 B2 | 12/2012 | Maleyran et al. | |
| 8,341,127 B1* | 12/2012 | Heithcock | G06F 17/30312 707/640 |
| 8,487,583 B2 | 7/2013 | Nokkonen et al. | |
| 8,689,034 B2 | 4/2014 | Alsina et al. | |
| 8,819,471 B2 | 8/2014 | Alsina et al. | |
| 8,868,859 B2 | 10/2014 | Schmidt et al. | |
| 9,317,369 B2 | 4/2016 | Freedman et al. | |
| 9,411,687 B2 | 8/2016 | Freedman et al. | |
| 9,465,696 B2 | 10/2016 | McNeil et al. | |
| 9,483,365 B2 | 11/2016 | Schmidt et al. | |
| 2002/0087590 A1 | 7/2002 | Bacon et al. | |
| 2002/0091956 A1 | 7/2002 | Potter et al. | |
| 2004/0236958 A1 | 11/2004 | Teicher et al. | |
| 2005/0131990 A1* | 6/2005 | Jewell | G06F 11/1464 709/201 |
| 2005/0137983 A1 | 6/2005 | Bells | |
| 2005/0165820 A1 | 7/2005 | Pudipeddi et al. | |
| 2005/0170827 A1 | 8/2005 | Nagashima | |
| 2005/0188165 A1 | 8/2005 | Wolfgang et al. | |
| 2005/0210304 A1 | 9/2005 | Hartung et al. | |
| 2005/0216788 A1 | 9/2005 | Mani-Meitav et al. | |
| 2005/0216911 A1 | 9/2005 | Yen et al. | |
| 2005/0289381 A1 | 12/2005 | Yeo | |
| 2006/0168351 A1 | 7/2006 | Ng et al. | |
| 2006/0206547 A1 | 9/2006 | Kulkarni et al. | |
| 2007/0005669 A1 | 1/2007 | Mueller et al. | |
| 2007/0016825 A1 | 1/2007 | Tarcea et al. | |
| 2007/0033252 A1 | 2/2007 | Combest | |
| 2007/0088764 A1 | 4/2007 | Yoon et al. | |
| 2007/0136389 A1 | 6/2007 | Bergant et al. | |
| 2007/0156925 A1 | 7/2007 | Shigeta et al. | |
| 2007/0196099 A1 | 8/2007 | Ishiyama et al. | |
| 2007/0204003 A1 | 8/2007 | Abramson | |
| 2007/0226730 A1 | 9/2007 | Coyle et al. | |
| 2007/0245105 A1 | 10/2007 | Suzuki et al. | |
| 2007/0260759 A1 | 11/2007 | Scott | |
| 2007/0294321 A1 | 12/2007 | Midgley et al. | |
| 2007/0294546 A1 | 12/2007 | Lee | |
| 2008/0065637 A1 | 3/2008 | Farlee et al. | |
| 2008/0104145 A1 | 5/2008 | Lipman et al. | |
| 2008/0126445 A1 | 5/2008 | Michelman | |
| 2008/0133622 A1 | 6/2008 | Brown et al. | |
| 2008/0140963 A1 | 6/2008 | Thomason et al. | |
| 2008/0155223 A1 | 6/2008 | Hiltgen et al. | |
| 2008/0189298 A1 | 8/2008 | Cha | |
| 2008/0201343 A1 | 8/2008 | Crescenti et al. | |
| 2008/0307019 A1 | 12/2008 | Weiss et al. | |
| 2008/0307348 A1 | 12/2008 | Jones et al. | |
| 2009/0063419 A1 | 3/2009 | Nurminen et al. | |
| 2009/0089537 A1 | 4/2009 | Vick et al. | |
| 2009/0144341 A1 | 6/2009 | Hauck et al. | |
| 2009/0249119 A1 | 10/2009 | Sethumadhavan et al. | |
| 2009/0254572 A1 | 10/2009 | Redlich et al. | |
| 2009/0307333 A1 | 12/2009 | Welingkar et al. | |
| 2010/0031248 A1 | 2/2010 | Sonkin et al. | |
| 2010/0052620 A1 | 3/2010 | Wong | |
| 2010/0057789 A1 | 3/2010 | Kawaguchi | |
| 2010/0095077 A1 | 4/2010 | Lockwood | |
| 2010/0262796 A1 | 10/2010 | Camborde | |
| 2010/0275110 A1 | 10/2010 | Frid-Nielsen et al. | |
| 2010/0293329 A1 | 11/2010 | Wang | |
| 2010/0313069 A1 | 12/2010 | Murata | |
| 2010/0332401 A1 | 12/2010 | Prahlad et al. | |
| 2010/0332818 A1 | 12/2010 | Prahlad et al. | |
| 2011/0026328 A1 | 2/2011 | Moshayedi | |
| 2011/0125717 A1 | 5/2011 | Manson | |
| 2011/0246427 A1 | 10/2011 | Modak et al. | |
| 2011/0306326 A1 | 12/2011 | Reed et al. | |
| 2012/0066612 A1 | 3/2012 | Virmani et al. | |
| 2012/0084261 A1 | 4/2012 | Parab | |
| 2012/0110287 A1 | 5/2012 | Han et al. | |
| 2012/0311366 A1 | 12/2012 | Alsina et al. | |
| 2013/0138609 A1 | 5/2013 | Schleifer et al. | |

FOREIGN PATENT DOCUMENTS

| | | |
|---|---|---|
| CN | 1661563 A | 8/2005 |
| CN | 1846197 A | 10/2006 |
| CN | 101566959 A | 10/2009 |
| CN | 101578580 A | 11/2009 |
| EP | 1455275 A2 | 9/2004 |
| EP | 2073461 A1 | 6/2009 |
| JP | H04199209 A | 7/1992 |
| JP | H11168837 A | 6/1999 |
| JP | 2001147784 A | 5/2001 |
| JP | 2003347988 A | 12/2003 |
| JP | 2008181287 A | 8/2008 |
| JP | 2009519522 A | 5/2009 |
| JP | 2009238227 A | 10/2009 |
| JP | 2010282468 A | 12/2010 |
| WO | 2007068600 A2 | 6/2007 |
| WO | WO2011053450 A1 | 5/2011 |

OTHER PUBLICATIONS

International Search Report from PCT Application No. PCT/US2012/039009 dated Jul. 16, 2012, pp. 1-4.

(56) References Cited

OTHER PUBLICATIONS

International Search Report and Written Opinion from PCT Application No. PCT/US2012/039013 dated Aug. 8, 2012, pp. 1-11.
Chinese Application for Invention No. 201280027224.0—First Office Action dated Sep. 14, 2015.
Chinese Application for Invention No. 201280027326.2—First OA dated Feb. 3, 2016.
Chinese Application for Invention No. 201280027180.1—First OA dated Feb. 24, 2016.
Chinese Application for Invention No. 201280027180.1—Second OA dated Oct. 11, 2016.
Japanese Patent Application No. 2014-513561—First Office Action dated Dec. 19, 2014.

* cited by examiner

METHODS AND APPARATUS FOR MULTI-PHASE RESTORE

CROSS-REFERENCE TO RELATED APPLICATIONS

This application is a continuation of U.S. patent application Ser. No. 14/645,088, filed Mar. 11, 2015, which is a continuation of U.S. patent application Ser. No. 13/227,344, filed Sep. 7, 2011, which claims the benefit of U.S. Provisional Patent Application No. 61/493,360, filed Jun. 3, 2011, all of which are incorporated by reference herein in their entireties for all purposes.

FIELD OF INVENTION

The present invention relates generally to restoring devices. More particularly, this invention relates to restoring files for devices in multiple phases.

BACKGROUND

With the proliferation of mobile devices, particularly mobile communication devices such as cellular telephones, personal data assistants (PDAs), tablet devices etc., backup and restore operations have increasingly become an integral part of daily use of these mobile devices. However, as working environments, mobile applications and/or network storage infrastructures continue to evolve, new challenges accompanied by constantly changing requirements on the mobile devices also emerge to support such capabilities.

For example, conventional backup/restore operations may be based on complicated interactions with backup/restore software and hardware using high bandwidth network connections. Mobile devices, however, are often used in transit with wireless network connections which may be unreliable, bandwidth limited and/or unpredictable from one location to another location. Therefore, lengthy time and/or multiple attempts may be required to complete the backup/restore operations for the mobile devices. Furthermore, additional security risk may be found in the openness of most wireless networks for these operations.

As such, existing mechanisms may not back up and/or restore mobile devices in a reliable, secure and user friendly manner.

SUMMARY OF THE DESCRIPTION

In one embodiment, resources in a device may be backed up to network based storage, also termed cloud storage, via multiple levels of abstractions to allow incremental and resumable backup operations. Backup sources may be dynamically configured for both improving backup/restore performance and/or minimizing impact on normal operations of the device. In one embodiment, the device may communicate with mobile backup service (MBS) to determine which portions of the resources (or files) to back up based on hierarchical data maintained in MBS. The hierarchical data may include owner account for the device, a backup tier (or representation) specific to each device associated with the owner account, and/or metadata describing each file that is backed up.

In one embodiment, MBS may communicate with a content service (such as the Mobile Me Chunk Service or MMCS) to identify which actual data chunks (or chunked data) of files should be uploaded for backup to avoid duplicate copies of data chunks, for example, in cloud storages. MMCS may track mappings between files and a set of chunk identifiers identifying data chunks of the files. In one embodiment, MMCS can dynamically configure or arrange vendor cloud storages to store content of the files identified for backup in containers of chunked data.

In another embodiment, metadata in a device may be maintained to track whether a resource (or file) represents user data (e.g. user created data) or purchased asset or content. Actual data of purchased asset may be downloaded or restored from available asset stores (or sites) without a need to be backed up. Certain freely available assets, such as Podcasts, may be re-downloaded by backing up their identifiers instead of being backed up and restored directly with their actual content. Metadata describing resources to be backed up may allow automatic identification of different sources for backup opportunistically transparently to a user. For example, backing up resources as a purchased asset may include making a note instead of pushing up content of the purchased asset. To restore the purchased asset as noted, the content of the purchased asset may be pulled down from an asset store. For example, an asset store may be a network accessible site hosting purchasable assets, storing purchased assets and/or hosting freely available assets (or content).

Optionally, resources may be split-restored back to a device from multiple sources such as cloud storages, local computers, asset stores and/or other applicable sources opportunistically. Metadata indicating types of media assets may be tracked for resources in a device to dynamically identify which sources are available and/or most cost effective for restoring (or backing up) the resources, for example, based on performance, bandwidth, power consumption and/or other applicable considerations.

For example, a device may notice a connection to a local computer (e.g. wired or wirelessly coupled) which stores a portion of content data for resources to be restored. The portion of content data may be pulled from the already connected computer. Subsequently, the rest of the resources, which are not available from the local computer, may be identified to be split restored from cloud storages and/or stores. As a result, content data, such as music, applications or other media files, may be backed up in the cloud (or cloud storages) but can still be recovered from a local computer for the device.

In one embodiment, files or resources may be selected for backup, for example, based on associated application, media type, or other extensible information. A resource may be tracked as a store asset (e.g. purchased asset available from an asset store) which can be available from stores without a need to back up actual content of the resource. Optionally, another resource may be tracked as a user data not available from stores and requires backup and restore, for example, via cloud storages. An application may be associated with resources including the application itself as store asset and application data as user data. Thus, an application and associated application data may be restored from different sources.

For example, selected resources in a device for cloud backup may include application data without including a corresponding application itself. The application may be re-downloaded to a device from an asset store and the application data may be restored from the cloud storage and/or a local computer. Alternatively, the application may be synchronized from the local computer to restore the application data from the cloud storage. Other combinations of backup sources for separately restoring the application and the application data may be possible. In some embodiments, application data may be restored before its corresponding application can be used (e.g. by a user). The application may be downloaded or synchronized prior to initiating restore of the application data (e.g. from the cloud storage or other sources) to create a proper ordering.

In one embodiment, restoring resources from a backup to a device may be performed in multiple phases to keep the device in a working condition usable and responsive to a user, while the resources are being restored. For example, a device may enter an initial modal restore session (e.g. a first mode) followed by a background restore session (e.g. a second mode) for a dual-phase or two phase restore of the device. The device, in one embodiment, may be usable by a user such that the device does not respond to user inputs in the initial modal restore session. In one embodiment, the initial modal session may be brief and fast for restoring core user files to reboot the device. Subsequently, the background session may allow a user to use the device while individual applications are being restored back to the device in the background. The device may be operational to respond to at least a set of user inputs in the background restore session.

In one embodiment, during the modal session of a two phase restore, a device may be briefly unusable while it downloads system resources for bringing the device into a working condition specific to a user. For example, system resources may include all metadata and system data, list of accounts, wallpaper, SMS (short message service) history, and/or other applicable user-specific non-application data. The system data plus the metadata can configure the device, for example, to behave as the user's phone. The device may reboot and come to life after the modal session.

In one embodiment, during the background session of a two phase restore, a device may restore data or media assets from local computers (e.g. running iTunes® application from Apple Inc.) and/or cloud storages. The device may synchronize mails and/or receive text messages during the background session. In one embodiment, resources may be restored according to a restore order determined by usage patterns. For example, application usage may be tracked to gather the usage patterns including shows/movies watched, books read, or other applicable usage statistics. In other embodiments, the restore order may depend on the size of the resource (or content), where an icon corresponding to the resource is located on the display of a device (e.g. user might put frequently used icons in the first page), or other applicable factors. The restore order may be dynamically updated adapting to user requests, such as via user tapping on the display to indicate priorities for applications.

In another embodiment, during a period of time in dual phase (or bifurcated) restore when a device is useable but not all data has been restored, UI (user interface) elements may be displayed to improve user experience and prevent applications from operating incorrectly or in unexpected ways. For example, icons representing applications and/or media libraries (e.g. for playing music, video or other media content/asset) whose object file(s) or user data has not yet been restored may be displayed grayed out, or include a progress bar to indicate that the applications are not yet available but will become so. Interactivity may be added by allowing the user to tap an icon of an application, or photo, or music, or video that the user would like to prioritize for restore.

In another embodiment, a method and apparatus are described herein to identify at least a first portion and a second portion of resources to restore back to a device. The first portion of the resources may be restored atomically to the device before the second portion of the resources. The device may not respond to at least one user input during the restoration of the first portion of the resources. If the restoring of the first portion is successful, the second portion of the resources may be restored. The device may respond to user input during the restoring of the second portion of the resources.

In another embodiment, a restore operation can be initiated with a backup service for a device associated with an account maintained in the backup service. Resources may be identified to transfer to the device with the backup service for the restore operation. A portion of the resources may be restored atomically to the device to enable the device to operate in a working condition of the account. The device may be non-responsive to user inputs before the portion of the resources is restored. A remaining portion of the resources may be restored to the device to complete the restore operation. The device can remain in the working condition before the restore operation is completed.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
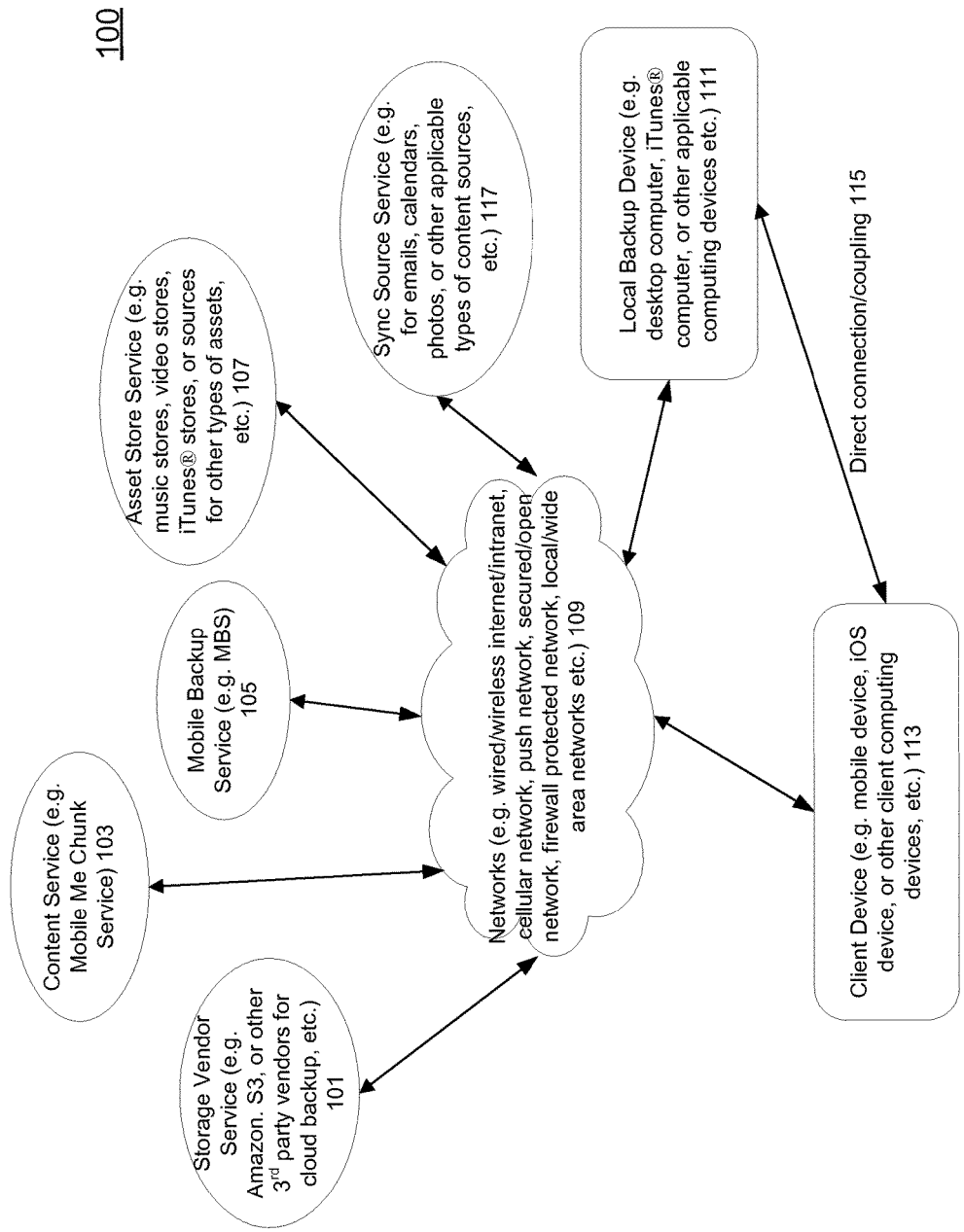
FIG. 1 is a block diagram illustrating one embodiment of network systems for multi-phase multi-source backup and restore.

Methods and apparatuses for backing up and restoring files for devices in multiple phases utilizing one or more sources are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g. circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, multiple sources may be available for backing up data or resources from a device. For example, generic data backup services may be offered in the cloud (or cloud storages, cloud services) via third party vendors such as Amazon, S3, Microsoft, etc. Purchased assets, such as songs, movies, and/or applications etc., can be downloaded from iTunes® stores in the cloud. User's computer(s) that runs backup service software, such as iTunes®, may be used to backup a device, such as an iOS® device, an iPhone® or iPad® device from Apple Inc.

Resources to be backed up from a device may be backup data including, for example, settings, account data, application data, photos, media files, purchased assets, and/or other data files. In one embodiment, backup data may be dynamically identified from existing resources in a device. A user computer (e.g. a desktop computer or a notebook computer) can store backup data for the device. Optionally or alternatively, subsets of backup data for a device may be stored in the cloud via cloud backup and/or via stores, such as iTunes® stores, for purchased assets in the backup data.

In one embodiment, an account, e.g. maintained by MBS server in the cloud, can be represented by hierarchical data including multiple backups (or backup structures) separately corresponding to different devices for the account. The hierarchical data may include an account containing a set of backups for a number of different devices. A backup may include a set of snapshots of files on a device. One backup per device may be supported.

A snapshot may represent a state of a device at a single point in time. A restore can be done from any snapshot in a backup to reconstruct the state of the device at that point in time. Snapshots may be numbered sequentially from a number (e.g. one), and these numbers may be assigned by a server. The first snapshot may be a complete backup of the device and the subsequent snapshots may be deltas based off the previous snapshot. Incremental snapshots may contain all the added, modified, and deleted files on the device since the previous snapshot.

A snapshot may be committed explicitly once its contents have been uploaded. There may be one uncommitted snapshot at a time and the uncommitted snapshot may be the last snapshot with the greatest number. Once a snapshot is committed, its contents may not be modified except by deleting it entirely.

When a snapshot is deleted, its contents may be merged into the previous snapshot unless it's uncommitted. As a result, a restore can still be done from any subsequent snapshot. The added/modified/deleted files in a target snapshot may be retained (e.g. won't be lost). Deleting an uncommitted snapshot may not cause a merge, and instead the contents may simply be discarded. When deleting the second snapshot from a sequence of snapshots stored, and merging files into the first snapshot of the sequence of snapshots, deleted files may not be retained as the first snapshot is complete. The first snapshot may not be deleted unless it is the only snapshot in the sequence of snapshots.

Each backup can include a snapshot taken from the corresponding device, for example, according to a configured schedule (e.g. hourly, daily, weekly, etc.). Each snapshot can include descriptions of a list of files or resources. Each file can be broken into chunks (or file chunking) of actual data (e.g. of certain size of bits) for cloud service(s) to store. Alternatively, file chunking may be based on technologies to split data items into chunks, for example, described in provisional patent application No. 61/433,152, entitled "Content Based File Chunking" by Dominic Giampaolo, filed on Jan. 14, 2011, which is incorporated herein by reference in its entirety.

Typically, multiple chunks may be aggregated as one container as a storage unit for the cloud service offered by, for example, third party vendors. A backup may be created, updated, deleted, disabled or operated as requested. For example, files of a given domain may be removed from a backup. The cloud storage does not store sufficient information to regenerate original files corresponding to chunks of data stored in the cloud storage. Thus, the files are inherently protected via data chunking. Encryption of the chunks of data may provide additional level of protection for data stored in the cloud storage.

In one embodiment, a device, such as an iOS device, can initiate backup operations with a backup service (e.g. hosted in an MBS server) in the cloud to identify backup data from resources of the device. Metadata describing backup status of the device may be maintained in the backup service, for example, via a backup structure corresponding to the device. The backup status may include a latest snapshot or a most recent series of snapshots of resources already backed up for the device. In one embodiment, the metadata can reference data chunks stored in cloud services via $3^{rd}$ party vendor(s) for the back up data of the device.

Backup data or files identified in a device for backup operations may be split into chunks of actual data bits ready for cloud storages. In one embodiment, MMCS code in a service framework of the device may communicate with an MMCS server in the cloud to prepare chunks of data to back up for the identified files. For example, backup data may be split into multiple chunks of data according to certain chunk configurations (e.g. a specific size of data bits for each chunk).

The service framework may determine which of multiple chunks of data prepared from files identified for backup are not currently available in the cloud and need to be uploaded. In some embodiments, the service framework (e.g. via MMCS code) may hash each chunk into a signature, e.g. via SHA hashing algorithms or other applicable algorithms, as an identifier for the MMCS server (or service) to determine whether the identified chunk has already been backed up in the cloud.

In one embodiment, files may be referenced into the MMCS. A device may assign arbitrary identifiers to the files. The device may use the identifiers to refer back to the files. The references may be crawled periodically (e.g. by a server) into the MMCS to garbage collect unreferenced data chunks of the files (or file chunks).

Backup operations for a device may be performed in multiple phases, such as setup phase, scan phase, backup phase, and/or other applicable phases, to coordinate with multiple services in the cloud. Each phase may correspond to a separate abstract layer of operations to allow dynamic configurations of cloud storages opportunistically to increase effectiveness and/or improve performance of the backup operations.

For example, during a setup phase, whether a backup (or backup structure) exists for a device in an MBS service may be determined. The MBS service may be asked to create the backup with initial metadata for the device if no backup exists for the device in the MBS service. In one embodiment, the device may include a backup cache reflecting a copy of the backup corresponding to the device in the MBS service. The backup cache may include one or more snapshots previously taken for the device.

In one embodiment, the backup cache may be rebuilt (e.g. by consulting the MBS service) to synchronize with the MBS service if needed (e.g. when snapshots cached in the backup cache are outdated according to messages communicated with the MBS service). Optionally or additionally, whether an uncommitted snapshot exists in the device may be determined during the setup phase. An uncommitted snapshot may not correspond to existing snapshots stored in the MBS service and may include descriptions of resources yet to be backed. An uncommitted snapshot may be created during the setup phase.

In one embodiment, a device may query the MBS service to determine if an uncommitted snapshot exists, for example, as part of making sure a backup cache is up to date. The device may create an uncommitted snapshot after scanning its file system during a backup operation. The backup cache may be incrementally updated to reflect what has been backed up successfully to, for example, the MBS and the MMCS services.

During the scan phase, the file system of the device may be scanned to find changes in files or resources, such as new files, deleted files, modified files, etc. In one embodiment, the changes may be identified via a comparison between the scanned files and snapshots stored in the backup cache. Which files are already backed up and which files need to be backed up may be tracked during the scan phase.

In the backup phase, actual file backup operations may be performed. For example, a snapshot may be created if needed (e.g. when there is no uncommitted snapshot available). Requests may be sent to the MBS service for creating entries of new files, modified files and/or deleted files in the MBS service. Quota authentication or right to access cloud storages may be received from the MBS service to allow sending backup request to the MMCS service. The backup request may include metadata describing files or changes of files to backup.

An authentication token may be received from the MBS service to indicate that requested backup is within limit of backup storage size imposed by the MMCS for a device. The authentication token may be sent to the MMCS service for a set of authorized HTTP (Hypertext Transfer Protocol) requests from a device to a storage vendor. MMCS service can interact with storage vendors (or cloud services) to retrieve an authorization key for the device. Changes (e.g. add/delete/remove) of files may be uploaded to the cloud service with the authorization key. If a confirmation of a successful upload is received from the cloud service, the snapshot corresponding to the upload may be committed between the device and the MBS service. A snapshot may be committed once it has been created and its content has been defined then uploaded to the MMCS.

In one embodiment, the MBS service may be based on metadata describing files at the file level. The MMCS service may depend on actual content or data (e.g. chunks of data) of the files. Hash signatures generated from actual content of files may be used in the MMCS service as identifiers for the content. The MMCS service may determine whether portions of the content identified by the identifiers are new (or have not yet been backed up), for example, in cloud storages. The MBS service may decide whether a file or files are new or have been updated according to metadata associated with the file or files.

In certain embodiments, backup services, such as MBS service, can maintain one or more backups for a device. The backups may include semantics describing what backed up data or files are, how to keep track of backed up data, identity of the corresponding device, how different backups are related (e.g. based on backup dates, incremental backup relationships, etc.) and/or other information. In one embodiment, a backup may be associated with one device under one account. Each account can include multiple devices. The backup can include multiple snapshots of the device. For example, the snapshots may be taken daily for resources of the device. Each snapshot may describe files changed in the device from a previous snapshot in the backup.

In one embodiment, resources of a device may be backed up based on multiple way handshakes to transmit files and/or metadata of the files between the device and services such as the MBS service, the MMCS service, cloud vendors (or storages) and/or other applicable services. The MBS service may track references of the MMCS service. The MMCS service may track references of the cloud vendors, for example, to allow the device to dynamically map files to structured data specified by the vendors.

In one instance of embodiment, the MMCS service may, according to a particular cloud vendor, identify a file in a device as an item, instruct the device to split the item into chunks of data, generate a unique identifier for each chunk of data and notify the device whether the device needs to forward an identified chunk of data to the cloud vendors for backup. The device may instruct or communicate with the MBS for putting information in a snapshot taken for the device and/or making the snapshot consistent with the device.

Thus, multiple services may provide layers of indirections for backing up resources of a device to isolate operations within one of the layers from affecting other layers. The MBS service may track metadata of the resources to back up, determine which files (or items) have already existed without a need to back up. The MMCS service may be responsible for tracking which vendors of cloud storages to store actual backup data, managing usage right of the cloud storages to create a ticket (or certificate) to enable the device to upload the backup data to the cloud storages, and/or performing garbage collection to delete structures representing chunks of data no longer referenced for backup. The MBS service may be insulated from (or unaware of) the cloud storages managed by the MMCS service.

In one embodiment, a snapshot generated for backup operations may not be marked as consistent before the snapshot is committed after the backup operations have been successfully completed. A fixed (or configured) number of latest snapshots (e.g. corresponding to daily snapshots for three days) may be cached in a device or stored in the MBS service. The number of snapshots may be limited to conserve storage space. Typically, the first (or earliest) one of the snapshots stored may be a full snapshot describing each resource of the device for corresponding backup operations. The rest of the snapshots may be incremental snapshots describing follow up changes of the resources relative to a previous one of the snapshots.

During the last phase of backup operations, in one embodiment, snapshots may be merged to collapse, for example, the earliest two or more existing snapshots into one full snapshot. As a result, the total number of snapshots stored may be maintained as a fixed number when a new snapshot is committed. In some embodiments, the MBS service may be notified (or instructed) to delete and/or merge existing snapshots as one atomic database operation. In response, an acknowledgement may be received from the MBS service to indicate whether the atomic operation is successful or not.

In certain embodiments, a backup source such as iTunes® store may be queried to identify a list of resources (e.g. applications, purchased assets or other assets) which may not be available for re-download. For example, the backup source may determine which of purchased assets associated with a device (e.g. based on a request from the device) are not available for re-download before the device performs content backup operations. Actual content of the list of resources not available for re-download from the backup source may be archived or backed up via backup services, such as the MBS, MMCS, etc.

In one embodiment, communications between a device and the MBS service provides client server protocols for managing backups (e.g. creating/deleting) and snapshots (e.g. creating/deleting/merging/updating). Updating a snapshot may be performed in an atomic manner where either all changes to a snapshot are incorporated (or committed) or the snapshot is not updated at all.

In some embodiments, protocols for managing snapshots via the MBS service may be based on metadata of files or resources for efficient and lightweight network communications. Metadata may describe information about the files in a device, such as filename, references to the files, sizes, timestamps, ownership, protection settings, or other applicable data associated with the files without describing actual content of the files. Which files or assets need to be included in backup operations may be determined based on the metadata descriptions. Delta or differences between separate snapshots may be tracked in terms of metadata descriptions.

For example, a device can maintain a cache using a last modified time value. Requests and responses may contain the last modified time value for accessing, deleting, updating, modifying or performing other operations on a resource. In one embodiment, requests on a resource may result in updating the last modified time value of parent resources of the resource. For example, deleting a backup of an account may update the last modified time value of the account. Adding files to a snapshot may update the last modified time values of the snapshot as well as the snapshot's parent backup and account.

Requests for managing snapshots may allow creating a new empty uncommitted snapshot, updating a previously created snapshot, deleting a snapshot and/or committing a snapshot. A response may indicate insufficient storage if reserving space for a requested snapshot would exceed a quota of an associated account. The request may include attributes of snapshots such as device name and version numbers.

In another embodiment, a list of files with their attributes may be retrieved from a snapshot via a request. An MMCS authorization token may requested for downloading a stream of files from the MMCS. Requests to managing files for snapshots may include, for example, creating, deleting, updating, marking, or other applicable operations. A response may indicate a conflict if the size of files in a snapshot would exceed the space reserved. In some embodiments, deleting a file from a snapshot may delete the underlying database record stored by the server and the deleted file may no longer appear in the list of files for the snapshot. Alternatively, marking a file as deleted may indicate that the file exists in a prior snapshot but no longer exists in a device.

Metadata of files in a device may correspond to one level of abstraction to determine which of the files to back up, for example, via the MBS service and/or to create snapshots for backup operations. Hashes of actual file content (e.g. bit by bit hash chunks) may provide another level of abstraction to identify, for example, via the MMCS service, which content of the back up files need to be uploaded. In one embodiment, separate files of the same content may be associated with different metadata descriptions. Thus, comparison based on content hashes or chunk signatures may allow sharing of backup storages (e.g. from the cloud) for files of the same content but with different metadata.

Backup operations can be resumed and/or switched. For example, a backup operation may be halted when a network connection is lost. The backup operation may be resumed when the network connection is reestablished. In one embodiment, which files to backup for a resumed backup operation may be determined based on signatures generated from file content (e.g. via the MMCS service). If files in a file system are changed before a backup operation is halted, the file system may be scanned again before resuming (or switching on) the backup operation. In some embodiments, for optimization, modification time stamps (or values) of a file may be compared with a corresponding time stamp in a backup cache while scanning a file system before consulting the MMCS service to determine if the file has changed.

Backup/restore operations between a device and a source or host may be halted (or terminated) and resumed based on sync anchor technologies, such as device anchor on the device and host anchor on the host. Examples of sync anchor technologies are described in issued U.S. Pat. No. 7,807,403 entitled "Synchronization Methods and Systems" by Gordon J. Freedman, which is incorporated herein by reference in its entirety.

In one embodiment, resources may be split restored to a device from multiple sources dynamically configured. For example, a purchased asset, such as applications, music, images, videos, TV-shows or other media data, may be downloaded from one or more stores in the cloud to the device when requested. The purchased asset may be stored in a local computer (e.g. owned by a user of the device) and ready for restore to the device as well.

In one embodiment, while the device is restoring the purchased asset from the cloud (e.g. a store) when moving within a close range of the local computer, a connection (e.g. wired or wireless connections) may be established between the device and the local computer. On detection of the connection and availability of the purchased asset in the local computer, the device may dynamically switch restoring sources for the purchased asset from the cloud to the local computer to complete restoring the remaining portion of the purchased asset (e.g. via iTunes® software hosted in the local computer. As a result, network connection cost can be reduced and restore performance can be increased.

In some embodiments, availability of resources of a device from multiple sources, such as stores, local computers or cloud storages may be tracked based on metadata of the resources. If a particular resource already exists in a store or a local computer, the particular resource may be restored from existing sources to the device without a need to backup actual content of the particular resource. For example, metadata of a resource may indicate ownership of a purchased resource for an account associated with the device. The purchased resource may be readily available from available sources such as stores from the cloud and/or local computers. As a result, the purchased resource may be reloaded from the available sources without a need to back up.

In one embodiment, resources in a device such as settings, account data, application data, and/or purchased assets, may be backed up to a local computer. Portions of the resources, such as the settings and/or application data, may also be backed up to cloud storages. Certain portions of the resources, such as the purchased asset, may be maintained and available in stores in the cloud. A resource may be restored from the local computer when available and from the cloud storages and/or the stores when the local computer is not connected to the device or when the resource cannot be located in the local computer. Certain assets which may be synchronized via sync operations with central services, such as emails, calendars or other applicable resources may not be backed up by backup operations.

In certain embodiments, metadata services, such as MBS service, may select which resources in a device are allowed to backup when providing authorization token to the device for backup operations. For example, certain $3^{rd}$ applications and/or data may be filtered and not allowed to be backed up. In one embodiment, data filtered from backup may include directories or documents declared by $3^{rd}$ party applications as not needing to be backed up, such as cached data or indices that can be regenerated. Alternatively, the resources to back up may be identified according to a quota limitation on total size of backup data imposed for an account associated of the device.

In one embodiment, whether all resources have been restored (or whether restore operations are completed) for a device may be tracked against multiple sources (e.g. cloud stores, local computers, stores etc.) where different resources or different portions of a certain resource may be restored from. For example, iTunes® running in a local computer communicating with the device may determine a particular resource stored in the cloud but not in the local computer has not been restored back to the device. The particular resource may be retrieved via the local computer for the device to complete the restore operation.

As an example, a new device, such as a new phone, activated for an account associated with a user may be restored from cloud backups of the account. The device may initiate restore operations with a backup service, such as MBS service with identifiers identifying the account and the device. Accordingly, descriptions of resources to restore may be determined, for example, with the MBS service. Cloud storages may be located (e.g. via a configuration, dynamically discovered, or obtained from connected services, etc.) to restore the resources determined. Alternatively, if a local computer running corresponding backup service application, such as iTunes®, is found available (e.g. within connection range of the device), the resources may be retrieved from the local computer without a need to access remote cloud storages.

Restore operations in a device may be performed in multiple phases including, for example, a modal restore phase followed by a background restore phase. Essential files or information, such as settings or metadata, may be restored first during the modal restore phase atomically (e.g. either all the essential files are restored or none are restored) to allow the device to boot into a working condition and quickly become available for a user without a need to wait for completing the rest of the restore operations. During the modal restore phase, the device may be laying down system files and may not be operational to receive user inputs. Atomic restore may ensure the device to run with a consistent set of data even before the resources are completely restored.

Subsequently, during the background restore phase, the rest of resources required to restore a device may be pulled in the background from available backup sources, such as cloud storages and/or local computers. For example, sizable resources, such as actual content of media assets (e.g. photos, videos, voice files etc.), 3rd party application data, or other applicable resources may be pulled during the background restore phase without affecting operation of the device or the user's ability to use at least some functions or capabilities of the device; for example, the user may be able to send a text message or browse the Internet or make a voice phone call in the background restore phase.

In one embodiment, a device may be synchronized (e.g. via sync operations) with a local computer (e.g. an iTunes® computer running iTunes® application) to ensure certain content or resources (e.g. music, applications, podcasts, videos, ringtones, photos, notes, email account settings, contacts, calendars, and bookmarks) on the device match a user selected subset of corresponding resources in the local computer. Application data may be backed up from the device to the local computer (e.g. in iTunes® backup) when synchronized. Purchased assets such as applications or media content may be downloaded from the local computer to the device for the synchronization (e.g. via iTunes® library).

In one embodiment, sync operations between a device and a local computer may be performed during (or after) background restore (phase) of the device. Communication or connection between the device and the iTunes® computer may not be available before the background restore as the device has not yet booted into a working condition. Sync operations may be capable of restoring assets (e.g. purchased media and/or applications) from the local computer (e.g. as iTunes® libraries) to the device.

Optionally or additionally, sync operations may restore application data or user data to a device from a local computer (e.g. as iTunes® backup). In one embodiment, the sync operations may include a comparison between the iTunes® computer and the device to identify a list of resources for the device to synchronize with. Restore operations and sync operations may rely on common module, such as ATC (Air Traffic Controller) code running in the device to pull actual content or bit data from applicable sources. ATC may automatically notice system event such as iTunes® sync (or pairing) event when the device is coupled or connected with an iTunes® device to transfer resources from the iTunes® device for the sync operations and/or restore operations.

In one embodiment, restore operations in a device may check with a connected backup service (e.g. an iTunes® computer or the MBS service) to determine a best source to restore a resource. Different sources may be identified for separate resources or assets, such as backup storages in the cloud (or cloud backup), backups in the local computer (e.g. iTunes® backup), stores (e.g. iTunes® stores) in the cloud, local libraries (e.g. iTunes® libraries) in the local computer.

One category of data may be restored from one source while another category of data from a separate source. For example, photos may be restored from the cloud storage, music content from the stores, applications from the local libraries, application data from the cloud storages, etc. Typically, sources in the local computer may be preferred than sources from the cloud because of, for example, less expensive connection cost and/or higher available network bandwidth.

In some embodiments, sync operations may be performed in multiple phases, such as a transactional phase followed by a best effort phase. During the transactional phase, metadata may be identified to describe a list of resources to synchronize between a device and a local computer. The metadata may be received from the local computer in a transactional manner (e.g. all or nothing). During the best effort phase, assets described by the metadata may be synchronized to the device from different sources dynamically determined considering, for example, availability, performance, cost and/or other applicable factors.

In certain embodiments, different sources for restoring resources may be identified dynamically based on, for example, metadata associated with the resources. Sync operations may push descriptions of a list of resources required to synchronize with a device from a locally coupled or connected computer (e.g. iTunes® computer). A purchased asset, such as a song, a video, a movie, an application, etc. may be transferred either from stores in the cloud or from a local computer (e.g. via iTunes® library). A media not purchased or acquired from a store, such as a photo taken by a user or a video downloaded from other devices, may be restored from cloud storage or from the local computer (e.g. via iTunes® backup).

Dynamic configurations of restore order may be advantageously applied in later phases (e.g. after the first phase or modal phase) of multi-phase restore for improving efficiency and/or usability of a device. For example, a list of resources or assets may be identified for restore in the start (or first) phase of restore. During a later phase of restore, such as a background phase for actual data transfer, selecting which of the identified resources to restore next may follow an order or priority dynamically determined on the fly. Multiple resources may be transferred at the same time for the restore, e.g. via multiple threads or processes.

Depending on a working status of a device and/or various heuristic criteria configured for resources yet to be restored or being restored, the order of selecting next resource(s) to transfer may be altered during run time. For example, resources of smaller size and/or requiring less time to transfer (e.g. higher bandwidth available for the associated sources) may be ranked higher (e.g. with higher probability of being selected as next resource to restore).

In one embodiment, usage of a device may be tracked to determine how resources should be ordered or prioritized for restore to increase usability of the device. For example, resources may be ordered according to associated applications. In certain embodiments, resources of the most recently used application may be assigned higher priority than resources of earlier used applications. A currently used application (e.g. movie or video playing) may be identified as the most recently used application in anticipating that an application data associated with the application may be accessed by a user soon.

In some embodiments, resources to restore may be prioritized according to display order of icons associated with the resources. For example, an application icon and/or a media icon associated with a resource may be presented on a display of a device according to the display order. The display order may reflect a priority implicitly specified by a user of the device. Optionally or additionally, user inputs (e.g. tapping on a display screen) may be received to dynamically control how resources should be transferred (e.g. pausing, restarting, starting, etc.).

In one embodiment, a list of resources to restore may be built with an order assigned based on characteristics heuristically configured and/or factors dynamically identified. Characteristics may include canonical information about a resource, such as size, type, location, and/or other applicable metadata associated with the resource. For example, a resource of a type of purchased asset may be of higher priority to restore than another resource of a type of user created content. Location of a resource may indicate where the resource was generated or purchased for a device. A resource associated with a location closer to a current location of the device may be of higher priority than another resource with another location farther away from the device.

Dynamic factors may be determined on the fly based on constantly changing working environments or usage patterns in a device. For example, dynamic factors may include available (restore) sources (e.g. cloud storages, stores, local computers etc.), usage history of applications, display order associated with application icons, user inputs or other applicable factors. Typically, a resource which can be transferred from an available source may be of a higher priority than another resource not found from currently available sources. Usage history for a resource may include, for example, frequency, last time the resource was accessed (e.g. via an application), usage count, and/or other usage statistics. A resource with higher usage frequency may be ranked higher.

In one embodiment, an initial list of resources to restore may be built during a first phase (e.g. modal phase) of a multi-phase restore. Heuristically determined characteristics and/or dynamic factors may be represented as heuristic weights assigned and combined to determine a restore order among the list of resources, for example, according to a separate combined heuristic weight for each resource. During a later phase of restore, resource(s) with highest weight(s) may be selected next to download.

For example, an ordered list of resources to restore may be forwarded to a restore process capable of restoring resources from at least one restore source (e.g. cloud storage, store, and/or iTunes® computer). The restore process may track a status of restore, monitor changes of environment (e.g. network connections, power status), detect user inputs, etc. to alter the order of the resources for restore. The restore may be interrupted (e.g. via a user input and/or a change of the environment) to rebuild a new list of resources with a new order to resume with the newly built list.

In one embodiment, a queue of resources to restore from a particular source (e.g. an iTunes® computer, or a cloud storage, etc.) may be maintained according a current ordered list of resources identified for restore. Separate queues may be maintained for different sources. In some embodiment, as the list of resources is dynamically built during run time (e.g. due to user interrupt, selection, and/or other system events, etc.), each queue may be updated (e.g. by moving a particular resource to the top of the queue) according to a newly built list of resources to continue the restore.

In some embodiments, actual content of resources may be restored in a cooperative manner according to how the resources are used via a device. For example, resources may be sandboxed around an application to allow the application to quickly become accessible when restoring the device.

Application programs and associated application data (or settings) may be sandboxed to be restored together.

Dependency of resources for a application, such as an executable program, libraries, application settings, application data (or user data, such as documents created by the user via the application), etc. may be maintained within a sandbox to identify an order to restore these resources to a device. The application may be made available to a user of the device even before all the sandboxed resources are restored. For example, running a music player application may require player settings to be restored before music content files are transferred to the device.

In one embodiment, multi-phase restore may coordinate with a user interface to allow a user to interact with a device during the restore (e.g. before the device is completely restored). Placeholders may be presented for live updating status or progress for each phase of restore. Actual transfer of resources may be dynamically reordered according to inputs received via the user interface.

For example, an application (e.g. photo viewer, video player, music player, etc.) and associated application settings may be restored to present a corresponding application icon on a user interface to indicate that the application is available. When detecting user interactions with the application (e.g. looking at a photo), higher priority may be assigned to resources related to associated application data (e.g. photos) for dynamically altering restore order.

In one embodiment, a state of restore for an application may be tracked by the application when a device is being restored. A state of restore for the application may be presented, for example, via a "spinner" type user interface element, a representation such as a thermometer-style progress indicator, or other applicable user interface elements. Whether assets for the application are available or not may be indicated via the user interface.

In certain embodiments, user interface elements to present a state of restore may include composite progress indicator based on combination of factors affecting the overall speed of the restore. The factors may be computed according to, for example, size of a application, download speed for a application from sources of the application, user data size, download speed for the user data from sources of the user data, install time, decryption time for media content (e.g. music, encrypted data etc.) and/or other applicable factors. The composite progress indicator may be presented or displayed as an intuitive unique thermometer style indicator, a pie chart style indicator or other applicable user interface style indicator depending on, for example, media type and/or context (e.g. for a springboard context, an iPod® application, etc.).

In some embodiments, different user interface components/functions may be presented (or enabled) depending on a state of restore. For example, assets which have been identified to restore (e.g. in a first phase of restore) but not yet restored may be grayed out, e.g. to disable user activation of an application for the assets. However, certain user interface operations, such as reorder, rename and/or delete, may be allowed for assets not yet restored. In some embodiments, the state of restore may include availability or unavailability of an asset. A source interface module may determine whether the asset to restore from a source (e.g. iTunes® store, asset store or other applicable storages) is currently not available, e.g. not present in the source and/or associated with incorrect access credential (e.g. password included in metadata of the asset).

In one embodiment, a list of resources or assets identified for restore may be maintained, e.g. in ATC module or a common module for both sync and restore operations, to dynamically alter restore order and/or reporting restore progress. Applications may access the restore progress via plug-in modules (e.g. libraries) and/or API (application programming interface). Accordingly, applications can provide live update of restore progress via user interface operations, e.g. graying out an icon, spinning an icon, moving a progress bar or other applicable user interface changes etc. For example, a user interface may present restore progress for an application to indicate that 20% or other percentages of assets have already been restored for this application.

An application may interrupt or alter restore operations working in the background phase. For example, a user may tap an application for a media asset (e.g. a song or a video) purchased from a store. In response, the application may request, e.g. via plug-in modules or APIs, reprioritization of asset transfers, e.g. via ATC module. A source interface module (e.g. itunestored) for an asset store in the cloud may be instructed to put the media asset as tapped by the user to the top of an associated queue to resume restore or transfer.

In one embodiment, a device may monitor a state of power sources during backup operations to maintain robust user experiences. On detecting a system event related to a change in power sources, the device may terminate or cancel processes (e.g. in the background) to backup (or restore) resources in a transparent manner without being noticed by a user. The system event may be caused by, for example, unplugging or disconnecting a power cord, inductive pad, or other power transfer mechanism, to the device.

In some embodiments, an event may be generated based on monitoring whether the device is plugged to a power source with sufficient power (e.g. to halt backup if the power source does not have sufficient power). Alternatively or optionally, an event may be based on whether a screen in a device is on or off and/or a status of network connection of the device. For example, if the screen turns on (e.g. for whatever reasons), automatic backup of the device may be canceled to avoid impacting user interface performance. If the event indicates the device is no longer connected to a WiFi network, for example, the automatic backup may be halted to avoid using cellular data via a cellular telephone network.

In some embodiments, alerts may be issued to provide an option for a user to select whether to continue backup/restore or not. The device may remain powered in a working condition, for example, to conserve battery power, without power drain caused by backup/restore operations in the background unknown to the user.

In one embodiment, a backup/restore state may be maintained in a device to allow backup/restore operations to resume, for example, when an external power line is plugged back. Backup operations may be resumed to rescan the device to identify which resources have been backed up without performing unnecessary backup operations on resources which have already been backed up prior to, for example, when the external power line is unplugged.

FIG. 1 is a block diagram illustrating one embodiment of network systems for multi-phase multi-source backup and restore according to one embodiment described herein. Networked systems 100 may include dynamically configured networks 109 connecting services 101, 103, 105, 107, 117 and devices 111, 113. For example, client device 113, such as a phone device, may be sporadically connected with asset store service 107 depending on where device 113 is located. Device 113 may be locally coupled or directly connected (e.g. via a wire) to a local backup device 111, which can be a desktop computer capable of accessing mass storage devices, such as hard disks, solid state devices, flash memories or other storage services. In one embodiment, client device 113 may be backed up and/or restored via multiple sources (e.g. servers, services or local devices) 101, 103, 105, 107, 111, 117 identified on the fly. Backup services or sources, such as services 101, 103, 105, 107, 111, 117 or other applicable content services may be capable of restoring an asset or content to a device, such as device 113, when requested without a need for the device to back up the asset.

Figure 2:
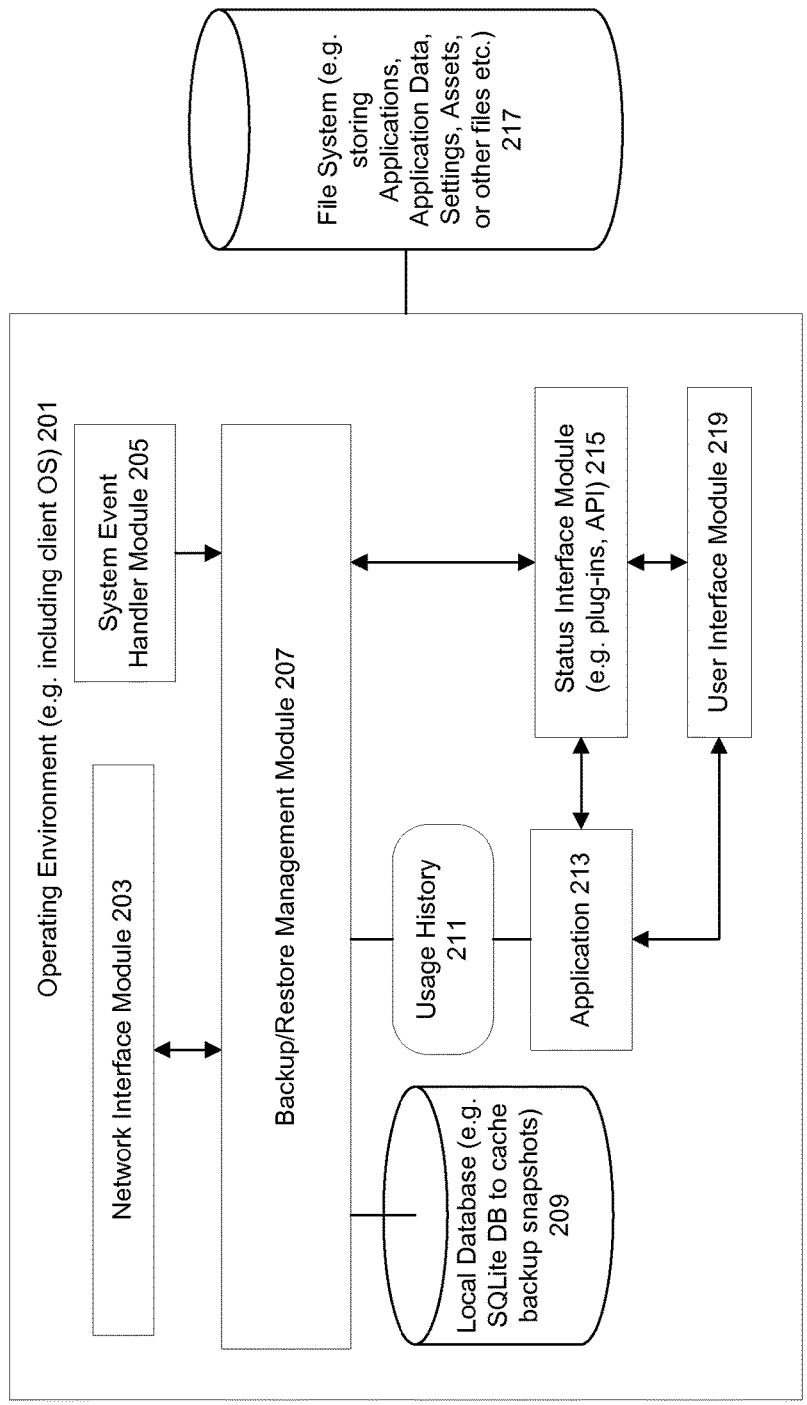
FIG. 2 is a block diagram illustrating an exemplary system for multi-phase multi-source backup and restore.

FIG. 2 is a block diagram illustrating an exemplary system for multi-phase multi-source backup and restore according to one embodiment described herein. In one embodiment, system 200 may be based on client device 113 of FIG. 1, running an operating environment 201, which may be based on iOS® operating system from Apple Inc. or other applicable operating systems.

System 200 may include backup/restore management module 207 to backup and restore resources of a device with selected sources via network interface module 203. The resources may include, for example, files in file system 217. Module 207 may initiate backup/restore operations on a user configurable schedule, e.g. daily, weekly, and/or on demand from requests received via remote devices and/or user inputs. In some embodiments, module 207 may interrupt or resume backup/restore operations in response to system events, such as loss of external power (e.g. when an external power cord is unplugged), monitored via system event handler module 205.

Local database 209 may cache or store one or more snapshots backed up for a device. A snapshot may represent a state of resources of a device backed up at certain point in time. Backup/restore operations may allow system 200 to revert back to a pervious state corresponding to a snapshot.

In one embodiment, one or more applications, such as application 213, may communicate with backup/restore management module 207 via, for example, status interface module 221. Application 213 may link with status interface module 221 as a plug-in or via API interfaces. In one embodiment, application 213 may access backup/restore status of associated resources to present a progress via user interface module 225.

Alternatively, application 213 may relay a user request, e.g. a user tap action, received via user interface module 225 to module 207 for reordering or altering backup/restore operations on the fly. The user request may be received via touch screen based, mouse based, pointer based, voice based, or other applicable user interface technologies. In one embodiment, usage history of application 213, such as usage counts, usage frequency, times of use, or other applicable usage statistics etc. may be recorded in usage history 211. Module 207 may dynamically configure backup/restore operations based on information collected via usage history 211.

Figure 3:
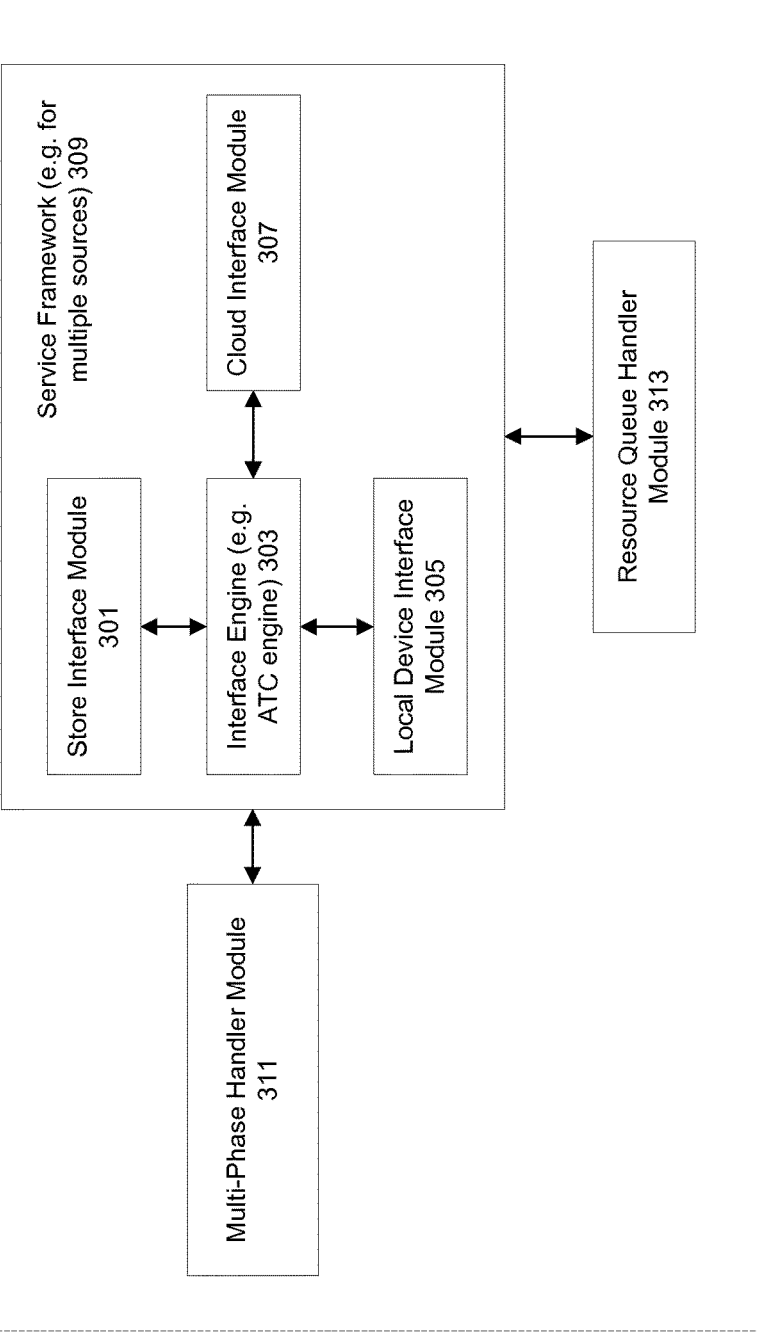
FIG. 3 is a block diagram illustrating an exemplary system for managing backup and restore in multiple phases using multiple sources.

FIG. 3 is a block diagram illustrating an exemplary system for managing backup and restore in multiple phases using multiple sources according to one embodiment described herein. System 300 may be based on system 200 of FIG. 2 including backup/restore management module 207. In one embodiment, system 300 may include service framework 309 capable of discovering and/or interfacing with multiple backup/restore sources for performing backup/restore operations.

For example, store interface module 301 (e.g. running as itunestored process) may communicate with available stores, such as store 107 of FIG. 1, for transferring purchased resources. Cloud interface module 307, may communicate with cloud storages, such as cloud back up service 101 of FIG. 1, for transferring actual content for backup/restore resources in a device. Local device interface module 305 (e.g. running as ituned process) may back up, restore, and/or synchronize resources by exchanging messages with corresponding service running in a local computer, such as iTunes® hosted in local back device 111 of FIG. 1. In one embodiment, interface modules 301, 305, 307 may share common interface engine 303, such as ATC engine or module, which may be capable of performing data transfer at a lower level of abstraction than interface modules 301, 305, 307.

Multi-phase handler module 311 (e.g. running as backupd process) can manage different phases of backup/restore operations. For example, multi-phase handler module 311 may initiate (e.g. according to a configured schedule) backup operations with backup service 105 to identify descriptions of a snapshot of resources to back up. In one embodiment, multi-phase handler module 311 may identify which resources to restore in a modal phase (or first phase) and/or subsequent phases (e.g. background phase) which may be modal-less (e.g. allowing interactions with a user).

In some embodiments, resource queue handler module 313 may dynamically reorder resources for restore and/or backup according to, for example, configured heuristics and/or user requests. Resources or assets may be transferred to/from different sources ordered according to separate queues of service framework 309. In one embodiment, in response to a user tap action or other UI actions (e.g. mouse click, voice command, keyboard selection, hand gestures, etc.) received from an application during restore (e.g. in the background) of a device, resource queue handler module 313 may reprioritize resources yet to be restored in favor of the application. Resource queue handler module 313 may instruct service framework 309 to update the queues to allow higher priority to, for example, download resources associated with the application.

Figure 4:
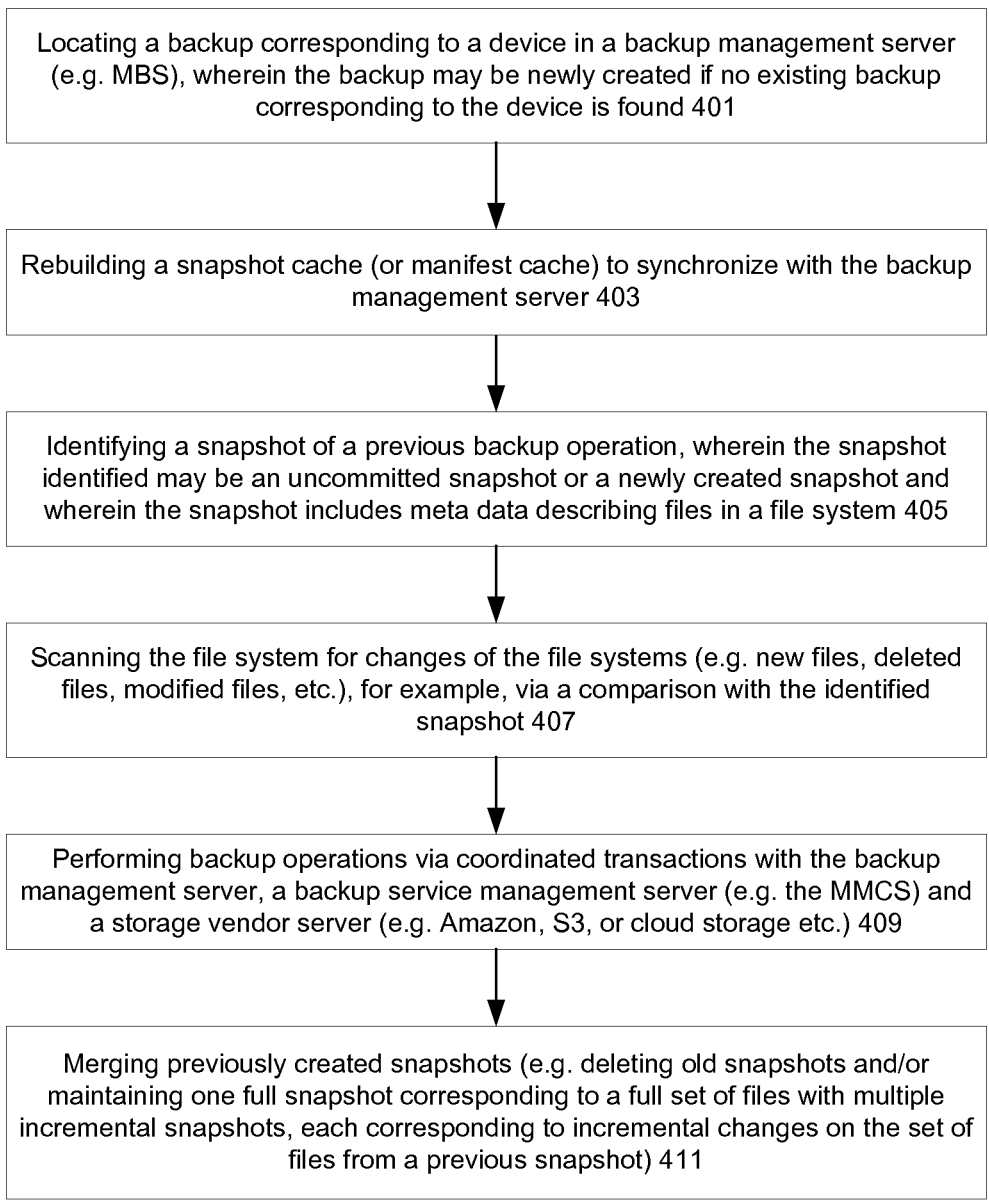
FIG. 4 is a flow diagram illustrating one embodiment of a process to perform incremental backup operations for a device.

FIG. 4 is a flow diagram illustrating one embodiment of a process to perform incremental backup operations for a device according to one embodiment described herein. Exemplary process 400 may be performed by a processing logic that may comprise hardware (circuitry, dedicated logic, etc.), software (such as is run on a dedicated machine), or a combination of both. For example, process 400 may be performed by some components of system 200 of FIG. 2.

In one embodiment, the processing logic of process 400 may perform backup operations including at least two steps. The processing logic of process 400 may transmit metadata to a backup service (e.g. the MBS) to receive tokens from the backup service to authenticate with a content service (e.g. the MMCS). Subsequently, the processing logic of process 400 may upload actual content to the content service using the tokens. Metadata for files in the backup service may be updated with the authentication tokens.

At block 401, the processing logic of process 400 may locate a backup corresponding to a device in a backup management server (e.g. MBS). The backup may be newly created if no existing backup corresponding to the device is found. At block 403, the processing logic of process 400 may rebuild a snapshot cache (or manifest cache) to synchronize with the backup management server. At block 405, the processing logic of process 400 may identify a snapshot of a previous backup operation. The snapshot identified may be an uncommitted snapshot or a newly created snapshot. The snapshot identified may include meta data describing files in a file system.

At block 407, the processing logic of process 400 may scan the file system for changes of the file system (e.g. new files, deleted files, modified files, etc.), for example, via a comparison with the identified snapshot. At block 409, the processing logic of process 400 may perform backup operations via coordinated transactions with the backup management server, a backup service management server (e.g. the MMCS) and a storage vendor server (e.g. Amazon, S3, or cloud storage etc.). At block 411, the processing logic of process 400 may merge previously created snapshots (e.g. deleting old snapshots and/or maintaining one full snapshot corresponding to a full set of files with multiple incremental snapshots, each corresponding to incremental changes on the set of files from a previous snapshot).

Figure 5:
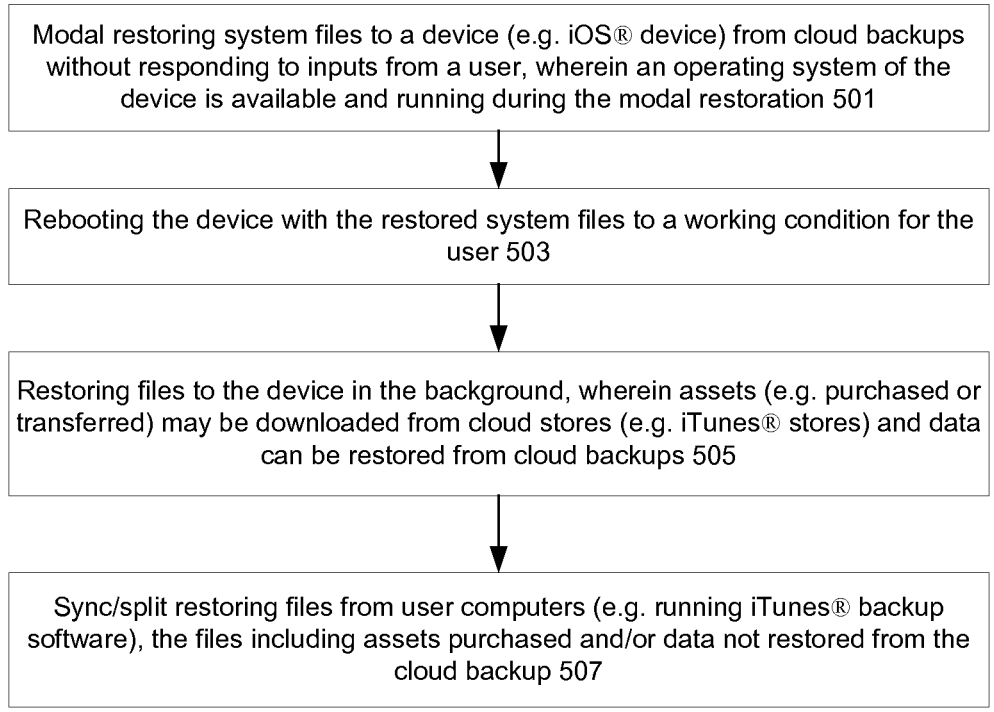
FIG. 5 is a flow diagram illustrating one embodiment of a process to perform incremental restore operations in a device.

FIG. 5 is a flow diagram illustrating one embodiment of a process to perform incremental restore operations in a device according to one embodiment described herein. Exemplary process 500 may be performed by a processing logic that may comprise hardware (circuitry, dedicated logic, etc.), software (such as is run on a dedicated machine), or a combination of both. For example, process 500 may be performed by some components of system 200 of FIG. 2.

At block 501, the processing logic of process 500 can modal restore system files to a device (e.g. iOS® device) from cloud backups without responding to inputs from a user. An operating system of the device may be available and running during the modal restoration. At block 503, the processing logic of process 500 can reboot the device with the restored system files to a working condition for the user.

At block 505, the processing logic of process 500 can restore files to the device in the background. Assets (e.g. purchased or transferred) may be downloaded from cloud stores (e.g. iTunes® stores) and data can be restored from cloud backups. At block 507, the processing logic of process 500 can sync/split restore files from user computers (e.g. running iTunes® backup software). The files may include assets purchased and/or data not restored from the cloud backup.

Figure 6:
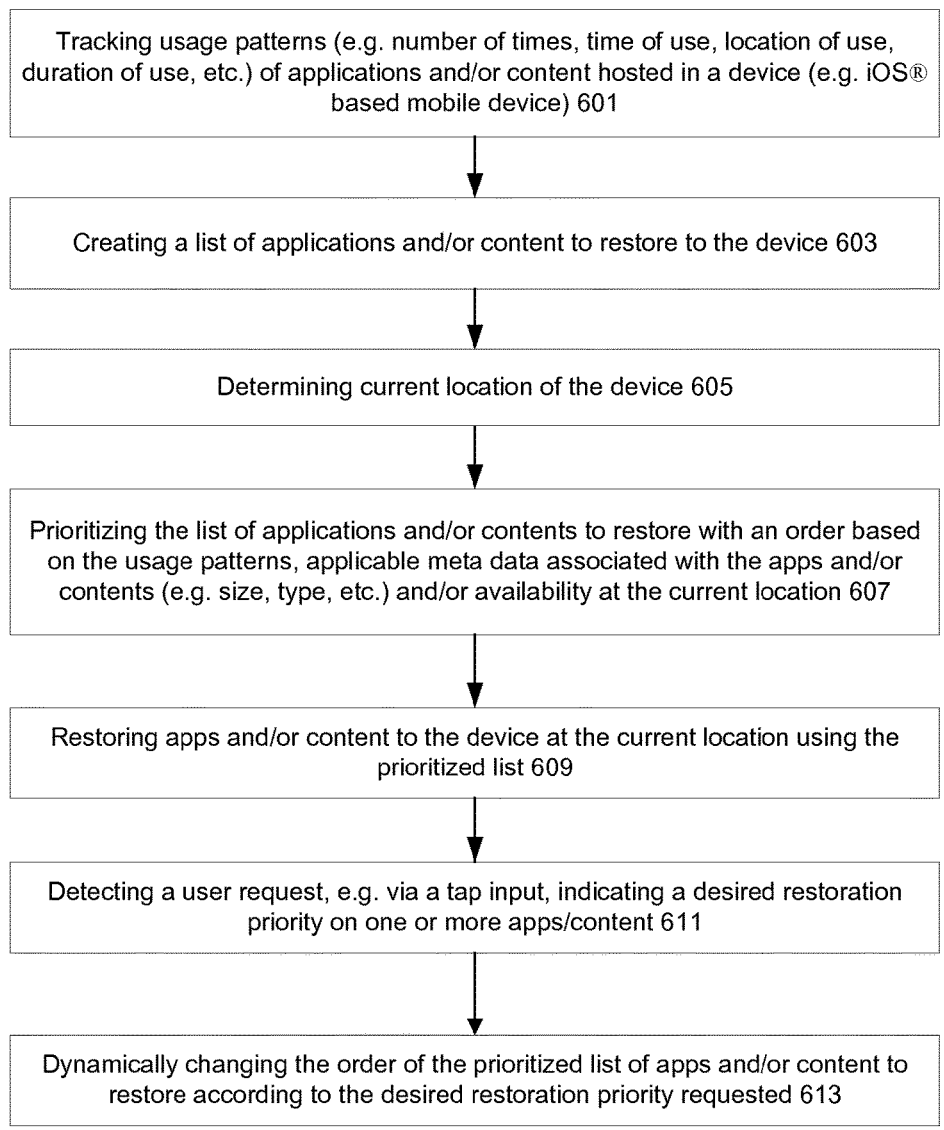
FIG. 6 is a flow diagram illustrating one embodiment of a process to dynamically prioritize resources to restore a device.

FIG. 6 is a flow diagram illustrating one embodiment of a process to dynamically prioritize resources to restore a device according to one embodiment describe herein. Exemplary process 600 may be performed by a processing logic that may comprise hardware (circuitry, dedicated logic, etc.), software (such as is run on a dedicated machine), or a combination of both. For example, process 600 may be performed by some components of system 200 of FIG. 2.

At block 601, the processing logic of process 600 can track usage patterns (e.g. number of times, time of use, location of use, duration of use, etc.) of applications and/or content hosted in a device (e.g. iOS® based mobile device). At block 603, the processing logic of process 600 can create a list of applications and/or content to restore to the device. At block 605, the processing logic of process 600 may determine current location of the device. At block 607, the processing logic of process 600 may prioritize the list of applications and/or contents to restore with an order based on the usage patterns, applicable meta data associated with the apps and/or contents (e.g. size, type, etc.) and/or availability at the current location.

At block 609, the processing logic of process 600 can restore apps and/or content to the device at the current location using the prioritized list. At block 611, the processing logic of process 600 may detect a user request, e.g. via a tap input, indicating a desired restoration priority on one or more apps/content. At block 613, the processing logic of process 600 may dynamically change the order of the prioritized list of apps and/or content to restore according to the desired restoration priority requested.

Figure 7:
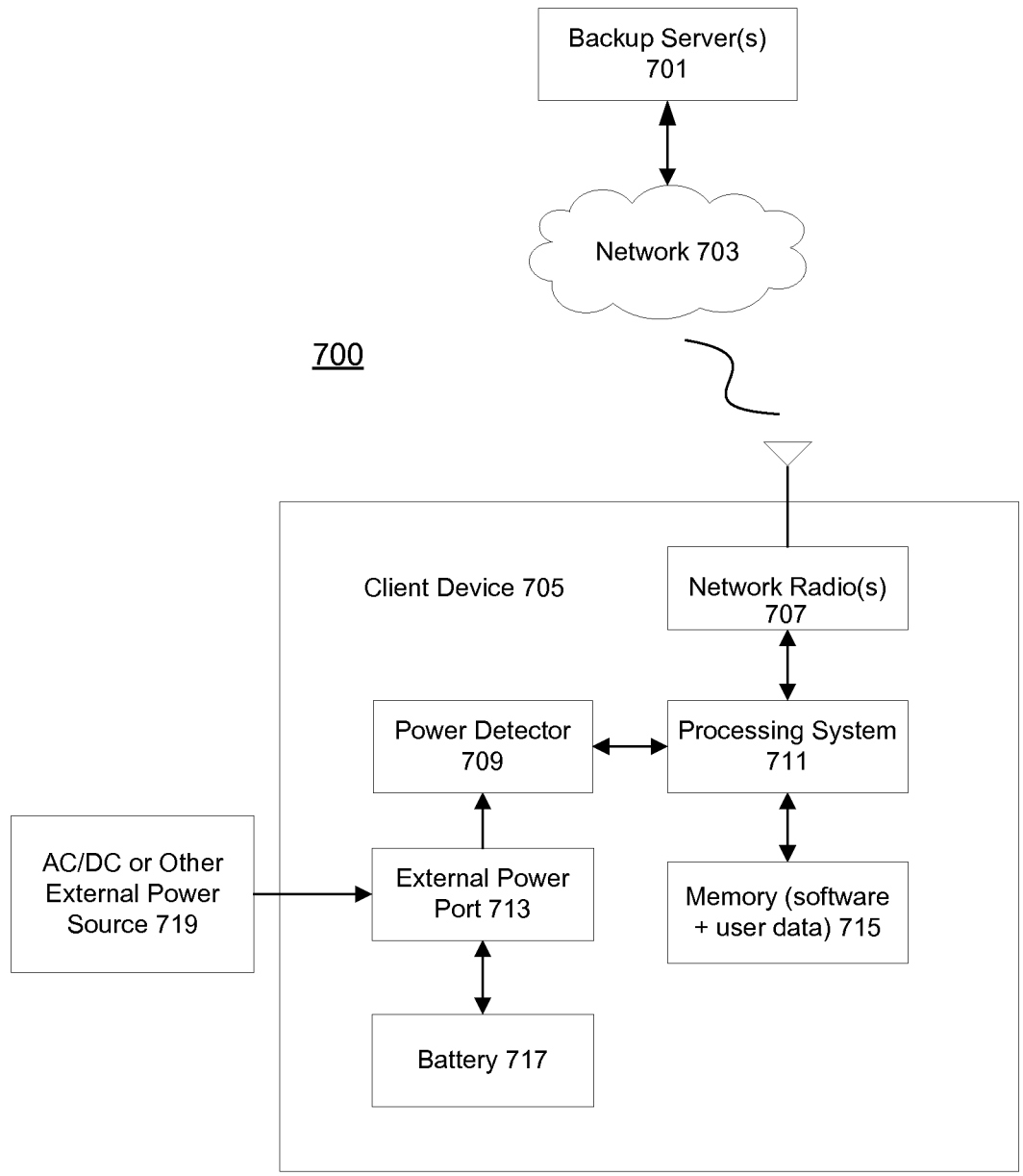
FIG. 7 is a block diagram illustrating an exemplary system to monitor power sources of a device for backup and/or restore operations.

FIG. 7 is a block diagram illustrating an exemplary system to monitor power sources of a device for backup and/or restore operations according to one embodiment described herein. System 700 may be based on a client device, such as device 113 of FIG. 1.

The system 700 can be configured to terminate an over the air (wireless) backup operation which has started and is in progress, in response to detecting that recharging from an external power source (e.g. an AC/DC adapter, a solar panel, an inductive charging pad, etc.) 719 has stopped. The system 700 includes an external power port 713, such as a jack or socket for a plug that is coupled to an output of an AC/DC adapter or other external power source, and a battery 717 that is recharged, under control of a recharging controller.

A power detector 709 is coupled to the external power port and is coupled to a processing system 711, which can be a microprocessor based system on a chip or other processing systems; the power detector monitors the availability of the external power source and the state of the recharging process and determines, based on that monitoring, whether the recharging process has been terminated as a result of a disconnection from the external power source. The power detector can, in response to detecting that the recharging process has been terminated, as a result of the disconnection, generate a termination signal (e.g. an interrupt signal on a bus which is coupled to the processing system) which causes the processing system to terminate the wireless backup operations.

In one embodiment, the backup operation has been started and is in progress before the termination and is backing up software or user data (e.g. contacts, calendar entries, user text files, user media files, such as songs or photos, etc.) or both which can be stored in the memory 715 of system 700. The processing system in system 700 can perform any one of the backup methods described herein to cause the software and/or user data to be stored, through the backup operations, on a remote device, such as a server 701 coupled to a network 703. The backup process is performed wirelessly through one or more radios (e.g. WiFi radio or cellular telephone radio) 707 in system 700, and these radios are coupled to the processing system in system 700 and are coupled to one or more networks. The network can be a single network (e.g. a wireless LAN) or a plurality of networks or a cellular telephone network that is coupled to the Internet, etc.

In response to the termination signal, the processing system can terminate the in progress backup process (which is incomplete at this point) either immediately or after completing the backup operation for the currently processed file in the backup operation. The processing system and/or one or more servers described herein can use signatures or sync anchors or other mechanisms to keep track of atomic backup operations in order to keep track of what has been completed in a prematurely terminated backup operation and what has not been completed in the prematurely terminated backup operation. The termination of the backup operation can be performed automatically by system 700 and without user request or interaction.

The backup process can resume from the terminated state when system 700 is again being recharged from an external power source. In one embodiment, the system 700 is backed up according to the one or more methods described herein when it is being recharged through an external power source, and it terminates the backup when disconnected from that power source and resumes from the terminated backup state when recharging is resumed. Hence, the backup process either starts or resumes, in one embodiment, in response to detecting that an external power source has been connected and is now charging the battery in system 700 as shown in FIG. 8.

Figure 8:
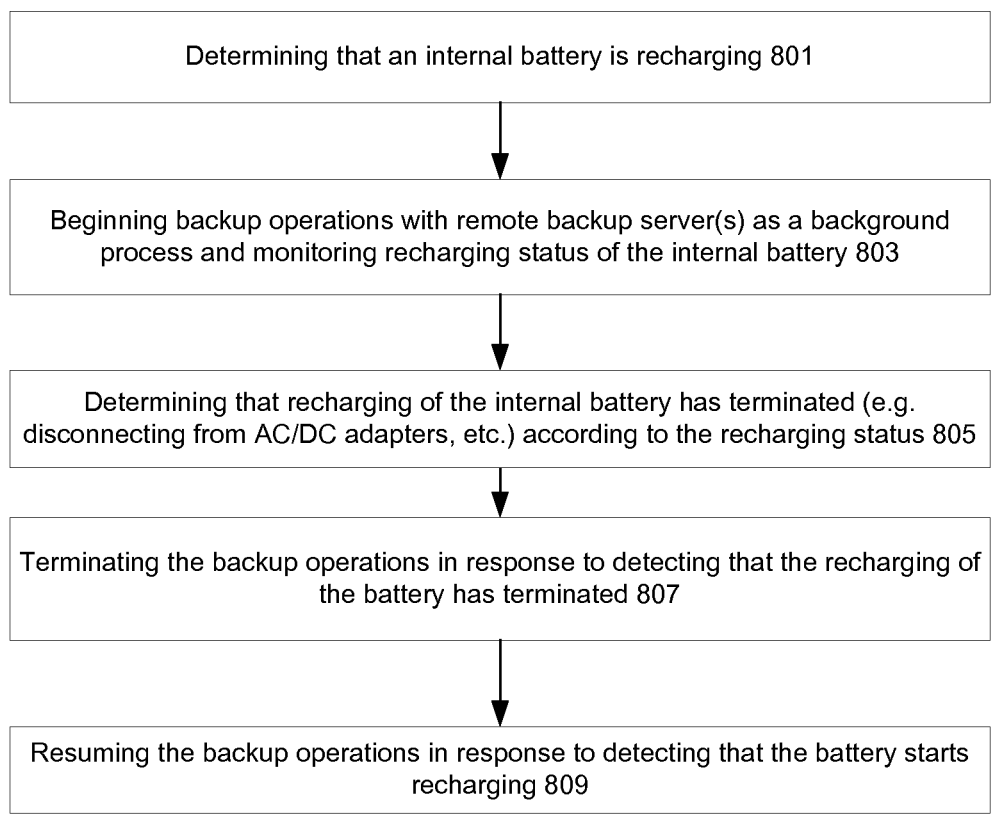
FIG. 8 is a flow diagram illustrating one embodiment of a process to interrupt backup and/or restore operations for a device to preserve power.

FIG. 8 is a flow diagram illustrating one embodiment of a process to interrupt backup and/or restore operations for a device to preserve power according to one embodiment described herein. Exemplary process 800 may be performed by a processing logic that may comprise hardware (circuitry, dedicated logic, etc.), software (such as is run on a dedicated machine), or a combination of both. For example, process 800 may be performed by some components of system 200 of FIG. 2 or system 700 of FIG. 7.

At block 801, the processing logic of process 800 may determine that an internal battery is recharging. At block 803, the processing logic of process 800 may begin backup operations with remote backup server(s) as a background process and monitoring recharging status of the internal battery. At block 805, the processing logic of process 800 may determine that recharging of the internal battery has terminated (e.g. disconnecting from AC/DC adapters, etc.) according to the recharging status. At block 807, the processing logic of process 800 may terminate the backup operations in response to detecting that the recharging of the battery has terminated. At block 809, the processing logic of process 800 can resume the backup operations in response to detecting that the battery starts recharging.

Figure 9:
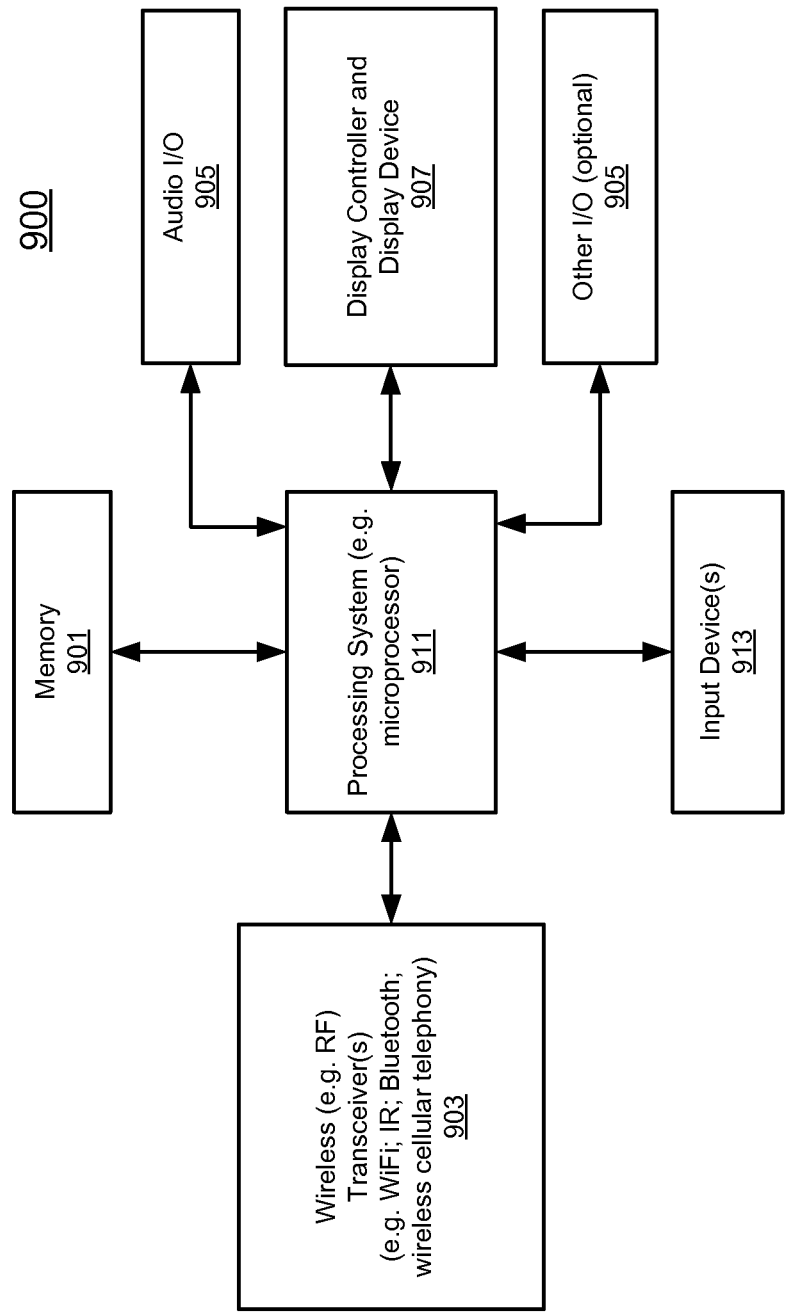
FIG. 9 shows one example of a data processing system which may be used with the embodiments described herein.

FIG. 9 shows one example of a data processing system which may be used with the embodiments described herein. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905 which may include a microphone and a speaker for, for example, playing back music or providing telephone functionality through the speaker and microphone. The system 900 can, in at least certain embodiments, automatically and/or manually perform multi-phase multi-source restore and backup described through a network or local connections. In one embodiment, the system 900 may include the system shown in FIG. 2.

A display controller and display device 907 provide a visual user interface for the user; this digital interface may include a graphical user interface which is similar to that shown on a Macintosh computer when running OS X® operating system software. The system 900 also includes one or more wireless transceivers 903 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system.

The data processing system 900 also includes one or more input devices 913 which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 900 may be a network computer or an embedded processing device within another device, or other types of data processing systems which have fewer components or perhaps more components than that shown in FIG. 9.

Figure 10:
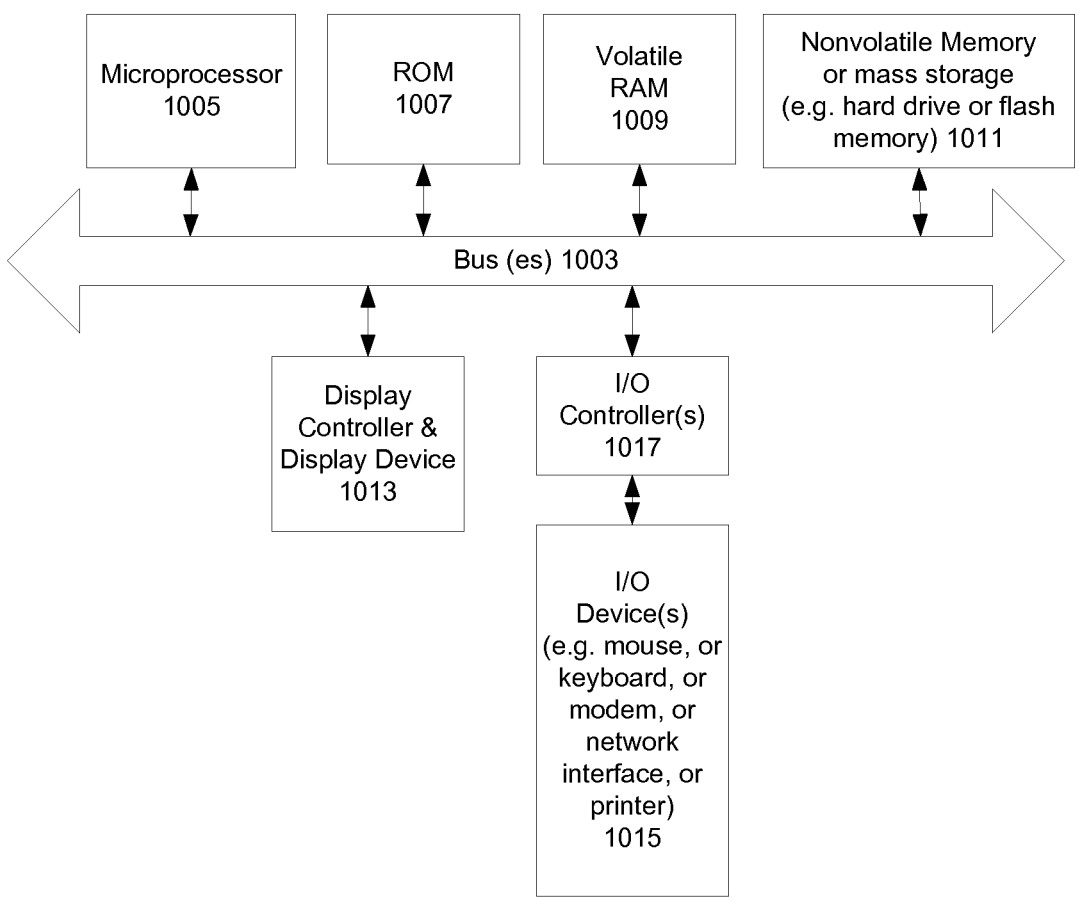
FIG. 10 illustrates an example of a typical computer system which may be used in conjunction with the embodiments described herein.

FIG. 10 shows one example of a data processing system such as a computer system, which may be used with one embodiment in the present invention. For example, the system 1000 may be implemented as a part of the system shown in FIG. 1. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1013 and to peripheral devices such as input/output (I/O) devices which may be mice, keyboards, modems, network interfaces, printers and other devices which are well known in the art. Typically, the input/output devices 1015 are coupled to the system through input/output controllers 1017. The volatile RAM (Random Access Memory) 1009 is typically implemented as dynamic RAM (DRAM) which requires power continually in order to refresh or maintain the data in the memory.

The mass storage 1011 is typically a magnetic hard drive or a magnetic optical drive or an optical drive or a DVD RAM or a flash memory or other types of memory systems which maintain data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract")

instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for backing up one or more resources in an ordered queue, the method comprising, at a computing device:
    backing up the one or more resources to a storage device over a network connection according to a prioritized order that is associated with the ordered queue, wherein the prioritized order is based on one or more respective usage statistics that are associated with each resource of the one or more resources;
    in response to the network connection becoming inactive:
        interrupting the backing up of the one or more resources to the storage device, and
        periodically determining whether the network connection becomes active; and
    in response to the network connection becoming active:
        determining whether at least one resource of the one or more resources that was backed up to the storage device has been modified;
    in response to determining that the at least one resource has been modified:
        modifying the prioritized order to form a rearranged order based on the one or more respective usage statistics that are associated with (i) the at least one resource, and (ii) any remaining resources of the one or more resources that remain to be backed up, and
        backing up the at least one resource and the any remaining resources to the storage device according to the rearranged order.

2. The method of claim 1, wherein the one or more respective usage statistics include at least one of a usage count, a frequency of usage, or a temporal proximity of usage for each resource of the one or more resources.

3. The method of claim 1, further comprising:
receiving an update for the prioritized order associated with the ordered queue; and
adjusting the prioritized order based on the update.

4. The method of claim 1, further comprising:
prior to backing up the one or more resources to the storage device:
generating a first snapshot of the computing device, wherein the first snapshot is associated with the one or more resources; and
subsequent to backing up the at least one resource that has been modified since the first snapshot and the any remaining resources to the storage device according to the rearranged order:
generating a second snapshot of the computing device, wherein the second snapshot is associated with the at least one resource that has been modified since the first snapshot.

5. The method of claim 1, wherein the one or more resources are backed up to a plurality of storage devices.

6. The method of claim 1, wherein the any remaining resources that remain to be backed up to the storage device are determined according to signatures generated from file content that is associated with the any remaining resources.

7. The method of claim 1, further comprising:
adjusting the prioritized order of the one or more resources in the ordered queue according to a user preference.

8. A computing device for backing up one or more resources in an ordered queue, the computing device comprising:
at least one processor; and
at least one memory storing instructions that, in response to being executed by the at least one processor, cause the computing device to:
back up the one or more resources to a storage device over a network connection according to a prioritized order that is associated with the ordered queue, wherein the prioritized order is based on one or more respective usage statistics that are associated with each resource of the one or more resources; and
in response to the network connection becoming inactive:
interrupt the back up of the one or more resources to the storage device, and
periodically determine whether the network connection becomes active; and
in response to the network connection becoming active:
determine whether at least one resource of the one or more resources that was backed up to the storage device has been modified;
in response to determining that the at least one resource has been modified:
modify the prioritized order to form a rearranged order based on the one or more respective usage statistics that are associated with (i) the at least one resource, and (ii) any remaining resources of the one or more resources that remain to be backed up, and
back up the at least one resource and the any remaining resources to the storage device according to the rearranged order.

9. The computing device of claim 8, wherein the one or more resources are backed up to a plurality of storage devices.

10. The computing device of claim 9, wherein the at least one processor further causes the computing device to:
establish a first portion and a second portion of a selected resource of the one or more resources; and
back up the first portion of the selected resource to a first storage device of the plurality of storage devices and back up the second portion of the selected resource to a second storage device of the plurality of storage devices.

11. The computing device of claim 8, wherein, in response to the network connection becoming inactive, the at least one processor further causes the computing device to:
receive a request to enable an option to back up the any remaining resources to the storage device via an alternative data connection;
enable the option; and
back up the any remaining resources to the storage device over the alternative data connection.

12. The computing device of claim 8, wherein the at least one processor further causes the computing device to:
prior to backing up the one or more resources to the storage device:
generate a first snapshot of the computing device, wherein the first snapshot is associated with the one or more resources; and
subsequent to backing up the at least one resource that has been modified since the first snapshot and the any remaining resources to the storage device according to the rearranged order:
generate a second snapshot of the computing device, wherein the second snapshot is associated with the at least one resource that has been modified since the first snapshot.

13. The computing device of claim 8, wherein the at least one processor further causes the computing device to:
receive an update for the prioritized order associated with the ordered queue; and
adjust the prioritized order based on the update.

14. The computing device of claim 8, wherein the at least one processor further causes the computing device to:
adjust the prioritized order of the one or more resources in the ordered queue according to a user preference.

15. At least one non-transitory computer-readable medium containing instructions that, in response to being executed by one or more processors of a computing device, cause the computing device to:
back up one or more resources in an ordered queue to a storage device over a network connection according to a prioritized order that is associated with the ordered queue, wherein the prioritized order is based on one or more respective usage statistics that are associated with each resource of the one or more resources; and
in response to the network connection becoming inactive:
interrupt the back up of the one or more resources to the storage device, and
periodically determine whether the network connection becomes active; and
in response to the network connection becoming active:
determine whether at least one resource of the one or more resources that was backed up to the storage device has been modified;
in response to determining that the at least one resource has been modified:
modify the prioritized order to form a rearranged order based on the one or more respective usage statistics that are associated with (i) the at least one resource, and (ii) any remaining resources of the one or more resources that remain to be backed up, and back up the at least one resource and the any remaining resources to the storage device according to the rearranged order.

16. The at least one non-transitory computer-readable medium of claim 15, wherein the one or more respective usage statistics include at least one of a usage count, a frequency of usage, or a temporal proximity of usage for each resource of the one or more resources.

17. The at least one non-transitory computer-readable medium of claim 16, wherein the one or more processors further causes the computing device to:
 establish a first portion and a second portion of a selected resource of the one or more resources; and
 back up the first portion of the selected resource to a first storage device of the plurality of storage devices and back up the second portion of the selected resource to a second storage device of the plurality of storage devices.

18. The at least one non-transitory computer-readable medium of claim 15, wherein, prior to backing up the at least one resource and the any remaining resources to the storage device, the one or more processors further causes the computing device to:
 receive an update for the rearranged order associated with the ordered queue; and
 adjust the rearranged order based on the update.

19. The at least one non-transitory computer-readable medium of claim 15, wherein, in response to the network connection becoming inactive, the one or more processors further causes the computing device to:
 receive a request to enable an option to back up the at least one resource that has been modified and the any remaining resources to the storage device via an alternative data connection;
 enable the option; and
 back up the at least one resource that has been modified and the any remaining resources to the storage device over the alternative data connection.

20. The at least one non-transitory computer-readable medium of claim 15, wherein the one or more processors further causes the computing device to:
 adjust the prioritized order of the one or more resources in the ordered queue according to a user preference.

\* \* \* \* \*